Patented Sept. 8, 1931

1,822,490

UNITED STATES PATENT OFFICE

LUCAS P. KYRIDES, OF BUFFALO, NEW YORK, ASSIGNOR TO NATIONAL ANILINE & CHEMICAL CO., INC., OF NEW YORK, N. Y., A CORPORATION OF NEW YORK

ACRIDINE DYES AND PROCESS OF MAKING SAME

No Drawing.    Application filed August 25, 1924.    Serial No. 734,134.

This invention relates to the production of new basic dyes of the acridine series which are of value for printing or dyeing leather and mordanted cotton as well as paper, silk, wool and other fibers. The invention includes also the printed or dyed fabrics or other material printed or dyed with the new dyestuffs.

It is well known that the sparingly soluble acridine dyestuff commonly known as "acridine yellow" (diaminodimethyl-acridine and its salts) can be transformed into a readily soluble dyestuff of a more reddish tint by treating it or its leuco compound with acetaldehyde in the presence of mineral acid, preferably hydrochloric acid. The dyestuff thus produced has the disadvantage of being particularly sensitive towards acids, so much so that it is reddened even by the tannic acid contained in mordanted cotton or in printing pastes. It is also moderately sensitive toward alkali.

According to the present invention, I have found that new coloring matters of the acridine series can be produced by subjecting the products obtainable by the action of aliphatic monaldehydes which contain 2 or more carbon atoms on aminoacridines in aqueous acid media to the action of zinc in the presence of acids, such as, for example, sulfuric acid, hydrochloric acid, acetic acid, etc.

The following specific example will further illustrate the invention, but it is understood that the invention is not limited thereto. The parts are by weight.

Example: 600 parts, on a dry basis, of the color base of the acridine dyestuff obtained, for instance, by treating an aqueous suspension of the color base of "acridine yellow" with acetaldehyde in the presence of hydrochloric acid at about 70° C. until the acridine yellow has dissolved and then adding caustic soda to the solution to an alkaline reaction whereby the color base of the resulting dyestuff is precipitated, and subsequently filtered off and washed, is dissolved in a mixture of about 7500 parts of water and about 2500 parts of 93 percent sulfuric acid at about 80° C. To this solution there is slowly added over a period of about 9 to 11 hours, 900 parts of zinc dust, the temperature of the solution being kept at about 80–85° C. The mixture is maintained at this temperature until the zinc has completely dissolved. This usually requires about three to five hours. If necessary, water is added from time to time to keep the volume of the mixture about constant. When the reaction is complete, 2500 parts water are added, and the solution is then cooled to about 55° C. and filtered. The dyestuff is salted out from the filtrate at a temperature of about 90° C. by the gradual addition of common salt, about 1200–1600 parts of common salt being usually required. The precipitated dyestuff is isolated by filtration or in any other suitable manner, and subsequently dried.

The dried dyestuff forms a reddish-orange powder easily soluble in water giving a yellowish-orange solution which possesses a slight green fluorescence. Sodium carbonate or ammonia produces a yellowish-orange precipitate of the color base from aqueous solutions. The dyestuff is soluble in concentrated sulfuric acid giving a greenish yellow solution, soluble in alcohol with a strong green fluorescence, and insoluble in benzene. It dyes cotton mordanted with tannin yellowish-orange tints.

If, in the foregoing example, the acetaldehyde derivative of acridine yellow be replaced by other aldehyde (i. e., aliphatic monaldehydes which contain two or more carbon atoms, such as propionaldehyde, butyraldehyde, crotonaldehyde, etc.) derivatives of acridine yellow or of other amino acridines (e. g., benzoflavine, acriflavine, phosphine, etc.), analogous coloring matters are obtained. These various aldehyde derivatives of the aminoacridines may be prepared by the action of the aldehyde on the aminoacridine in the presence of mineral acid, the process being similar or analogous to that employed for the production of the acetaldehyde derivative of acridine yellow.

The term "aminoacridines" includes the color bases and their salts, and the leuco-compounds of the same.

I claim:

1. The process of producing coloring matters of the acridine series which comprises subjecting the products obtainable by the action of aliphatic monaldehydes which contain at least two carbon atoms on amino acridines in the presence of mineral acids to the action of zinc in the presence of acids.

2. The process of producing coloring matters of the acridine series which comprises subjecting the products obtainable by the action of aliphatic monaldehydes which contain at least two carbon atoms on acridine yellow in the presence of mineral acids to the action of zinc in the presence of acids.

3. The process of producing coloring matters of the acridine series which comprises subjecting the products obtainable by the action of acetaldehyde on acridine yellow in the presence of mineral acids to the action of zinc in the presence of sulfuric acid.

4. As new products, the coloring matters obtainable by the process as claimed in claim 1.

5. As new products, the coloring matters obtainable by the process as claimed in claim 2.

6. As new products, the coloring matters obtainable by the process as claimed in claim 3.

7. The process of producing a coloring matter of the acridine series which comprises subjecting to the action of zinc a sulfuric acid solution of a color base obtainable by treating acridine yellow in the presence of hydrochloric acid with sufficient acetaldehyde to effect solution of the acridine yellow; and subsequently precipitating the color base of the resulting dyestuff by the addition of caustic alkali.

8. As a new product, the coloring matter obtainable by the process as claimed in claim 7.

9. Material dyed with a coloring matter obtainable by the process as claimed in claim 1.

10. Material dyed with a coloring matter obtainable by the process as claimed in claim 2.

11. Material dyed with a coloring matter obtainable by the process as claimed in claim 3.

12. Material dyed with a coloring matter obtainable by the process as claimed in claim 7.

In testimony whereof I affix my signature.

LUCAS P. KYRIDES.